United States Patent [19]
Heinrich

[11] 4,350,347
[45] Sep. 21, 1982

[54] RADIAL-SHAFT SEALING RINGS WITH HEAT DISSIPATION SEGMENTS

[75] Inventor: Richard Heinrich, Heilbronn, Fed. Rep. of Germany

[73] Assignee: Kaco GmbH & Co., Heilbronn, Fed. Rep. of Germany

[21] Appl. No.: 114,711

[22] Filed: Jan. 23, 1980

[30] Foreign Application Priority Data

Jan. 24, 1979 [DE] Fed. Rep. of Germany ....... 2902531

[51] Int. Cl.³ .......................... F16J 15/32; F16J 15/54
[52] U.S. Cl. .................................... 277/153; 277/134; 277/22; 277/165; 277/207 R
[58] Field of Search .......... 277/152, 153, 165, 207 R, 277/207 A

[56] References Cited
U.S. PATENT DOCUMENTS

| | | | |
|---|---|---|---|
| 3,348,851 | 10/1967 | Symons et al. | 277/134 |
| 3,501,155 | 3/1970 | Dega et al. | 277/134 X |
| 3,534,969 | 10/1970 | Weinand | 277/134 X |
| 3,633,927 | 1/1972 | Van Deven | 277/134 |
| 4,174,845 | 11/1979 | Hadaway | 277/134 |

FOREIGN PATENT DOCUMENTS

| | | | |
|---|---|---|---|
| 1941675 | 2/1971 | Fed. Rep. of Germany | 277/134 |
| 1294041 | 4/1962 | France | 277/134 |
| 215407 | 9/1967 | Sweden | 277/134 |
| 1196451 | 6/1970 | United Kingdom | 277/134 |
| 1252911 | 11/1971 | United Kingdom | 277/134 |

*Primary Examiner*—Robert S. Ward, Jr.
*Attorney, Agent, or Firm*—Becker & Becker, Inc.

[57] ABSTRACT

A radial-shaft sealing ring with a sleeve-like sealing body which has at least one sealing lip with at least one sealing edge. At least the end face of the sealing body is at least partially unevenly embodied, at least along the radially inner segment thereof, which adjoins the sealing edge.

11 Claims, 12 Drawing Figures

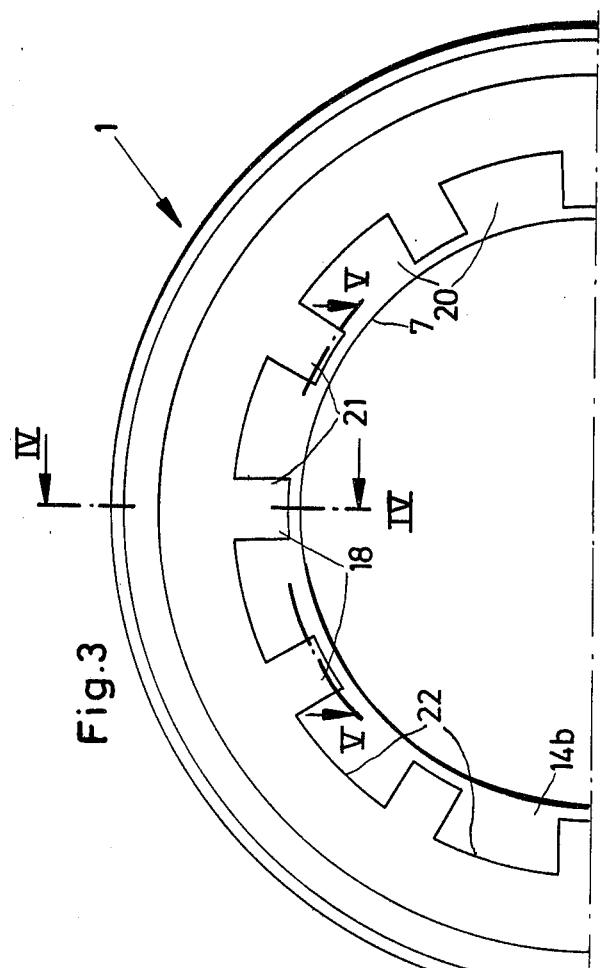
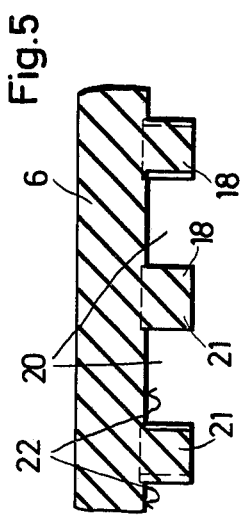
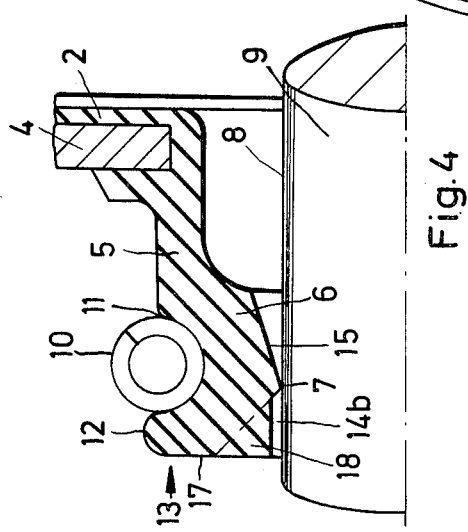
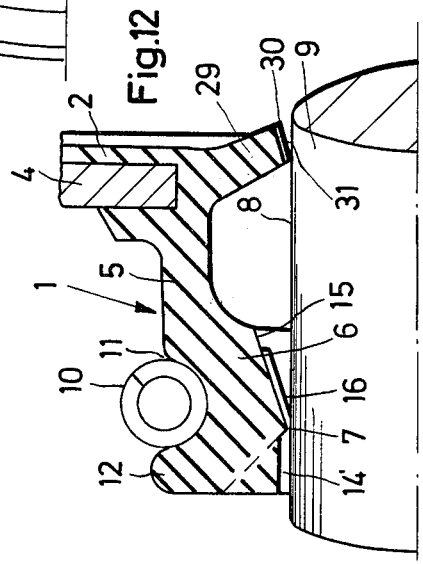

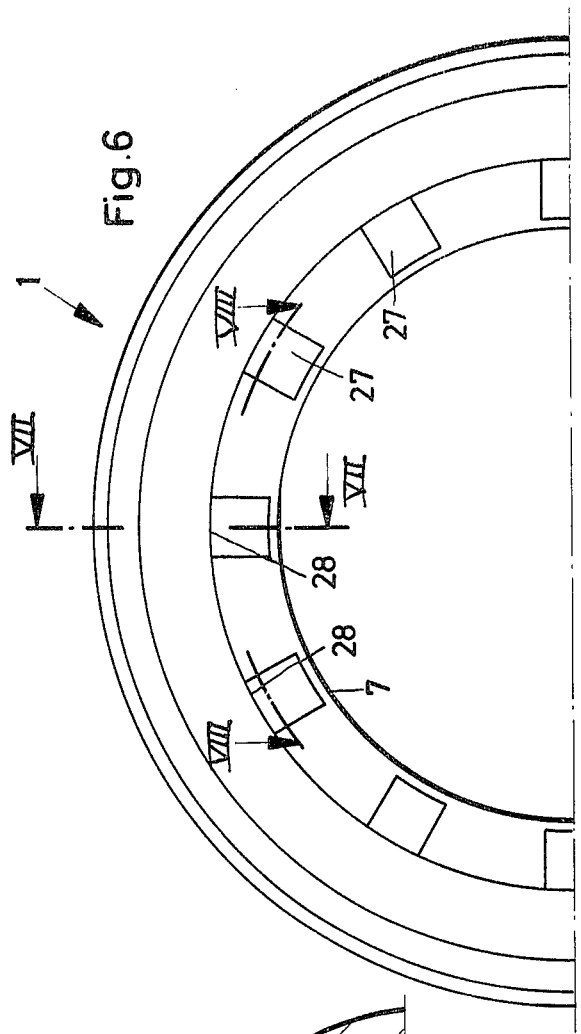
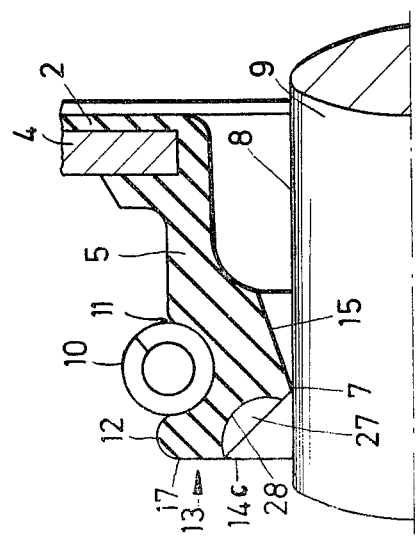
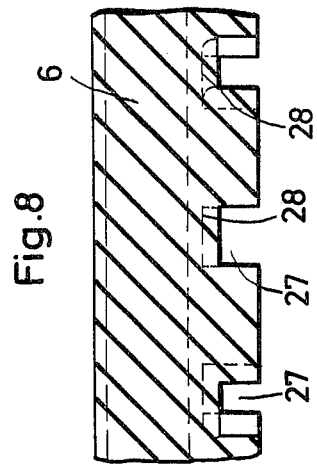

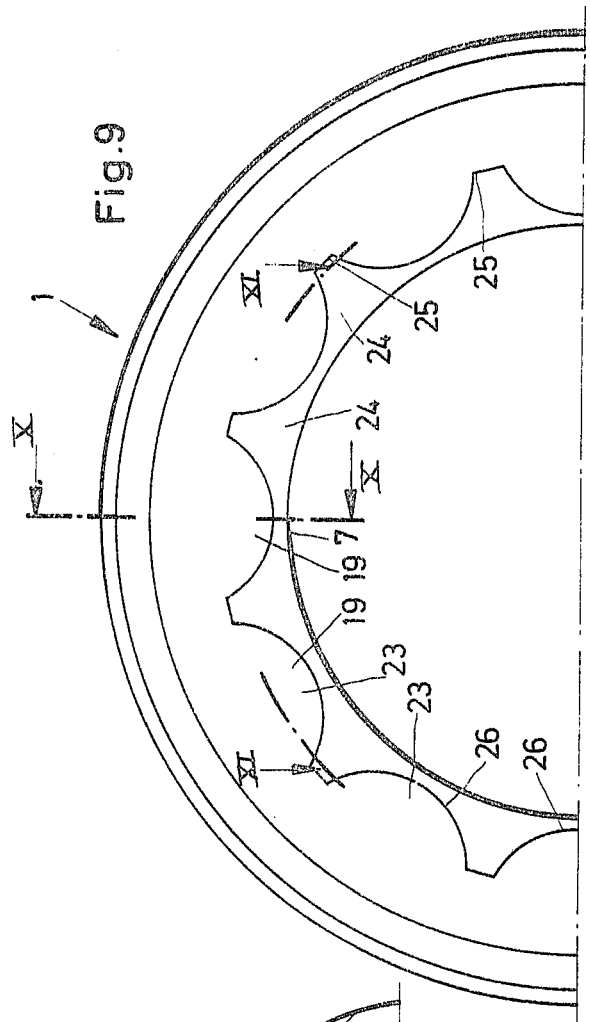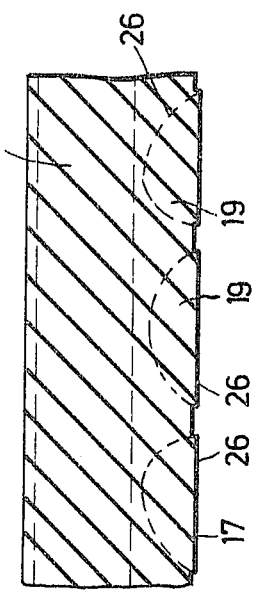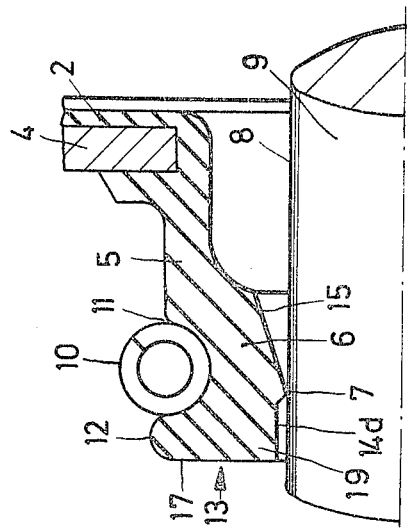

RADIAL-SHAFT SEALING RINGS WITH HEAT DISSIPATION SEGMENTS

The present invention relates to a radial shaft sealing ring with a sleeve-like sealing body, which has at least one sealing lip with at least one sealing edge.

Such sealing rings lie or engage against a sealing surface therewith. The sealing edge of such sealing rings is under a preload, especially against the outer surface of a shaft or the like; consequently in the peripheral direction, friction forces are effective upon the sealing body as well as the shaft. The friction heat arising hereby can lead to damaging of the seal and the shaft if the heat cannot be dissipated quickly enough. With the known sealing rings, the contact surface is relatively small, so that such an undesired excessive heating can result.

It is an object of the invention to embody a radial shaft sealing ring of the initially mentioned type in such a way that the resulting friction heat can be so quickly and completely dissipated that an excessive heating of the sealing edge is avoided.

This object, and other objects and advantages of the present invention, will appear more clearly from the following specification in connection with the accompanying drawings, in which:

FIG. 3 is a plan view upon that end face of a further inventive sealing ring which faces the oil side;

FIG. 4 is a section taken longitudinally along the line IV—IV in FIG. 3;

FIG. 5 is a section taken longitudinally along the line V—V in FIG. 3;

FIGS. 6, 7 and 8 illustrate a fourth embodiment of an inventive sealing ring in illustrations corresponding to the views of FIGS. 3, 4 and 5;

FIGS. 9, 10 and 11 illustrate a fifth embodiment of an inventive sealing ring in a representation corresponding to the illustrations of FIGS. 3, 4, 5, 6, 7 and 8; and FIG. 12 is a sixth embodiment of an inventive sealing ring in a representation corresponding to that of FIG. 1.

Figure 1:
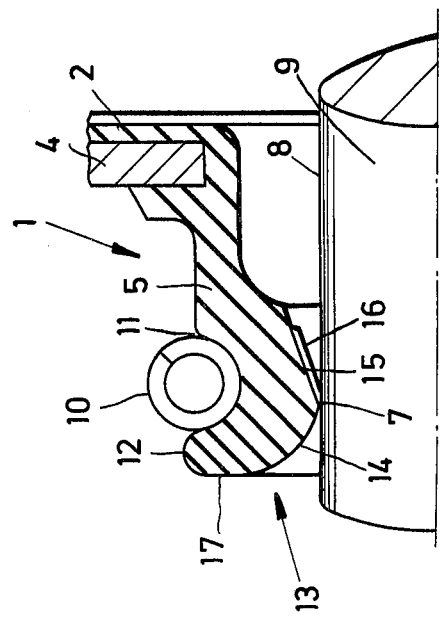
FIG. 1 shows in axial cross section a part of an inventive sealing ring which is arranged upon a shaft.

The sealing ring of the present invention is characterized primarily in that at least the end face of the sealing body is at least partially unevenly embodied, at least along the radially extending inner segment which adjoins the sealing edge.

As a consequence of the uneven embodiment, the engagement surface of the contact surface with the medium is especially large, as a result of which, per unit of time, a greater heat quantity can be dissipated by the sealing edge to the surrounding medium. This quick and good heat dissipation hinders or precludes that the sealing edge or the pertaining engagement surface of the shaft or the like are excessively heated, so that damaging of these parts can be satisfactorily avoided.

Referring now to the drawings in detail, the radial shaft sealing rings illustrated in FIGS. 1–12 comprise collar-, ring-, or sleeve-like sealing bodies 1 of elastic, especially elastomeric, material. The sealing body is reinforced or stiffened in the region of the transverse web 2 and the non-illustrated outer leg with an insert 4, which preferably comprises metal and has a cross section that is approximately L-shaped. The inner leg 5 of the sealing body 1 is embodied in a thickened manner with spacing below the transverse web to form a radially inwardly projecting sealing lip 6 (e.g. FIG. 4). The sealing lip 6 extends into a peripheral sealing edge 7.

This sealing edge 7 engages with a preload against the mantle surface 8 of a shaft 9. The sealing edge 7 is spring-loaded relative to the mantle surface, and for this purpose a spring 10 is arranged in a peripheral groove 11 with radial spacing from the sealing edge against the outer side 12 of the leg 5.

As a consequence of this preloading, rubbing or friction heat results during installation of the seal against the sealing edge, and this friction heat must be quickly and completely dissipated to avoid an excessive and damaging heating of the sealing edge or the shaft. For this purpose there is inventively provided a special arrangement of that end face directed away from the transverse web 2 of the sealing body 1, in other words on the side facing the medium oil. For this purpose, the resulting heat is to be improved by an enlargement of the end face and consequently a greater contact surface with the medium, and/or by a more intensive circulation or flow around this contact surface. With both illustrated embodiments, the greater contact surface is attained by elevations, reliefs, or depressions in that radially inner segment of the end face 13 which adjoins the sealing edge. The elevations or depressions can lead to turbulence with an appropriate design as a twist or whirl-like body. By means of this turbulence, the contact surface is subjected to flow or circulation of the oil in a more intensive manner around it. A suitable formation can also be provided upon the oppositely located side of the sealing edge 7, i.e. on that side facing the transverse web 2, in the radially inner segment 15 adjacent to the edge 7. In this case, the heat is quickly dissipated still further by large surface and intimate contact with the other medium, namely the air. In this connection, webs or ribs are provided that extend in the axial direction of the sealing ring; these webs or ribs are provided uniformly in the peripheral direction along the segment 15. These ribs 16 serve not only to improve the contact surface, but are also effective as twist bodies which effect the intensive circulation or flow around the segment 15 and accordingly around the sealing edge 7 by or through the air.

With the embodiment according to FIG. 5, the inner segment 14 of the end face 13 is curved convexly outwardly, so that a peripheral bead is formed which leads to a considerable enlargement of the evenly or smoothly embodied segment 14.

A suitable enlargement can, however, also be attained by a concave design or arrangement of the segment 14a (FIG. 2), so that a peripheral groove is formed. The bent or curved segments 14 and 14a, with the embodiments according to FIGS. 1 and 2, have relatively large radii of curvature in such a manner that they extend to approximately the level or height of the deepest point of the groove 11, and at this location merge with the radially outer, evenly or smoothly extending segment 17 or 17a of the oil side end face 13. Also the corresponding segments 14b, 14c, and 14d of the embodiments according to FIGS. 3–11 extend approximately over half the height of the end face 13, whereby on the one hand a stable arrangement of the inner leg 5 is created in the region of the sealing lip 6, and on the other hand a large contact surface with the oil is created, whereby a good heat dissipation is assured.

With the embodiments according to FIGS. 3–5 and 9–11, the radially inner segments 14b and 14d of the end faces 13 are located at an incline, preferably approximately at an angle of 45° to the axis of rotation of the sealing rings, and have web- or knob-like protrusions 18, 19 respectively which are arranged with a preferably equal spacing with respect to each other. These webs 18 or knobs 19 project freely downwardly in a direction toward the sealing edge 7, so that these elevations, in a plan view (FIGS. 3 and 9), extend in a meandering or wavy configuration. With the embodiment according to FIGS. 3–5, the depressions 20 formed between the webs 18 have their greatest depth in the region of the free ends of these webs; the depressions 20, however, have a slightly smaller width at this location than in the region of their bottoms 22. The width of the webs 18, which is essentially the same over their entire length, is, in the embodiment, approximately equal to half the width of the depressions 20 in the region between the free ends 21 of the webs 18. The large embodiment of the depressions and the relatively narrow webs assures the desired large surface engagement of the contact side with the pertaining medium, and leads to the turbulence of the medium, which causes the intimate flow or circulation around the contact surface.

Also with the embodiment according to FIGS. 9–11, the protrusions have the greatest thickness, or the depressions 24 formed between adjoining or adjacent protrusions 19 have the greatest depth in the region of the free ends 23. Because of the approximately semi-circular contour of the protrusions 19, when seen in plan view according to FIG. 9, the depressions have the smallest width in the region of the bottoms 25 thereof, which width is considerably smaller than the greatest width of the protrusions 19; this width is approximately equal to one fourth of this greatest width.

As shown in FIG. 11, the protrusion form with the radially outer segment 17 of the end face 13 an even or smooth outer surface, while the outer surface 26, which faces the sealing edge 7, is bent or curved in a partially circular manner in the direction of the bottom 25 of the depressions 24 (FIGS. 9 and 11). The knobs 19 respectively form twist bodies, which on the one hand enlarge the even contact surface 14d, and on the other hand lead to turbulences in the pertaining medium (oil).

The embodiment according to FIGS. 6 through 8 differs from the previously described embodiments therein that in the radially inner segment 14c, there are provided window-like recesses 27 which respectively have a rectangular contour or outline (FIG. 6) and have a semi-circular curved or bent bottom 28 (FIGS. 7 and 8). The recesses 27 lie with respect to each other with approximately the same or equal spacing as do the protrusions of the embodiment according to FIGS. 3 through 5, and also have approximately the same width as these protrusions 18. An enlarged contact surface is again created by these recesses 27, and this enlarged contact surface, as a consequence of the symmetrically alternating elevations and depressions, leads to turbulence in the medium and is effective as a twist body. In place of this square shape of the recesses 27 in the plan view of FIG. 6, the recesses can also be provided with triangular, rectangular, or also round outlines. The recesses, however, can also be formed by slots which are arranged in more or greater spacing from each other. The extensions as illustrated in FIGS. 3 through 5 and 9 through 11 can have a different outline in plan view upon the pertaining end face 13. In any event, the segments 14 and 14a through 14d of the sealing lips 6 of the different embodiments respectively provide surface segments which extend in a partially circular curve or bend.

Finally, FIG. 12 shows a last embodiment, with which an approximately radial peripheral protective lip 29 is provided on the transverse web 2 of the sealing body 1. The end face 31 is provided with ribs 30 which extend over the entire width of the end face and are essentially embodied identical to the ribs 16 of FIG. 1. This sealing ring corresponds in all other respects to the described embodiment, whereby the uneven end face segment 14' is preferably embodied corresponding to those of FIGS. 4 or 10. Additionally, the radially inner segment 15 is further provided with ribs 16, as illustrated in FIG. 1. An embodiment is also possible which has a protective lip, and with which no ribs are provided on the segment 15 or with which the segment 14' is embodied differently, for example with elevations according to FIGS. 1, 2 or 7. The additional protective lip 29 with the twist ribs 30, aside from the sealing effect, increases the desired heat dissipation considerably.

In summary, at least the end face 13 of the sealing body 1 is provided at least on its radially inner segment 14 which adjoins the sealing edge 7, at least partially in an uneven manner. The radially inner segment 14 of the end face 13 may have a plurality of depressions 20, 24, 27 and/or elevations (18, 19) which are located serially one after the other in the peripheral direction with preferably equal spacing, and is preferably at least partially bent or curved, preferably concavely. The radially inner segment 14 of the end face 13 may form an axially outwardly projecting peripheral bead (FIG. 1).

Figure 2:
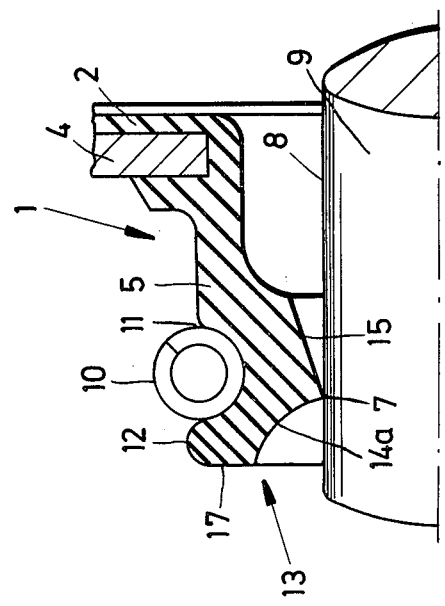
FIG. 2 illustrates a second embodiment of a sealing ring in a view corresponding to that of FIG. 1.

The radially inner segment 14a of the face side 13 may form a peripheral groove (FIG. 2).

The groove 14a and/or the bead 14 may be embodied in a partially circular form in the axial section (FIGS. 1 and 2). The depth of the depressions 20, 24 may increase radially inwardly (FIGS. 1, 2; 3 through 5; 9 through 11).

The depressions 27 may be embodied in a window-like manner, and are arranged in the peripheral direction, preferably with equal spacing from each other (FIGS. 6 through 8); preferably, the depressions 20, 27 in a plan view upon the end face, have a rectangular outline, whereby preferably the bottoms 22, 25, 28 of the depressions 20, 24, 27 are preferably bent or curved in a concave manner; especially the depressions 20, 24, 27 extend approximately over half the height of the end face 13 and terminate a short distance above the sealing edge 7.

Both radially inner sealing lip (6) segments 14 and 15, which adjoin or have a boundary along the sealing edge 7, may be embodied unevenly, preferably with web-like elevations 16 and 18, whereby the elevations 16 are twist ribs of the running surface of the sealing lip 6; preferably the elevations 16 and 18 of the segments 15 and 14 of the end face 13 extend in the axial direction; especially the elevations 19 are embodied in a knob-like manner and have a free end 23 in the direction of the sealing edge 7.

The transverse web 2 may be provided with at least one protective line 29 (FIG. 12). The protective lip 29 may have elevations 30, preferably twist ribs.

The present invention is, of course, in no way restricted to the specific disclosure of the specification and drawings, but also encompasses any modifications within the scope of the appended claims.

What I claim is:

1. A radial-shaft sealing ring for a medium being sealed, which comprises in combination: a sleeve-like sealing body having a radial inner periphery and at least one sealing lip with at least one sealing edge subject to radial preloading by a spring in a groove and frictional heat that causes premature wear thereof, said sealing body having two axial ends, one of which is in the form of an end face which has a first radially inner segment, said at least one sealing lip and said at least one sealing edge being arranged on part of said radial inner periphery of said sealing body between said two axial ends, with said radially inner segment of said end face adjoining said sealing edge, with at least said end face toward the medium being sealed, at least one said radially inner segment thereof, being at least partially unevenly shaped including depressions rather than only edge projections, said depressions extending in axial direction with depth thereof decreasing from the end face side as well as the segment in a direction toward the sealing edge so that heat is removed and dissipated quickly along the shortest path to surrounding medium, said depressions being provided also with the segments having a relatively great radius of curvature so that the segments extend as far as to the groove with the spring therein, said depressions being provided for greatly enlarged inner surfacing thereof particularly to facilitate heat dissipation more uniformly from said sealing lip with said sealing edge thereof to prevent excessive heating of the sealing ring having a long life expectancy and duration of use therewith.

2. A sealing ring in combination according to claim 1, in which, to provide said uneven shape, said first radially inner segment is provided with a plurality of at least one of depressions and elevations which are spaced from one another and are arranged one after the other in the peripheral direction.

3. A sealing ring in combination according to claim 2, in which said depressions and elevations are respectively evenly spaced from one another.

4. A sealing ring in combination according to claim 2, in which the depth of said depressions increases radially inwardly.

5. A sealing ring in combination according to claim 2, in which said depressions are window-like and are spaced from one another in the peripheral direction, said depressions extending approximately over half the height of said end face and terminating a short distance from said sealing edge.

6. A sealing ring in combination according to claim 5, in which said depressions are equally spaced from one another.

7. A sealing ring in combination according to claim 5, in which, viewed in plan upon said end face, said depressions have a rectangular outline.

8. A sealing ring in combination according to claim 5, in which said depressions have concavely curved bottoms.

9. A sealing ring in combination according to claim 1, in which said at least one sealing lip has a second radially inner segment, which adjoins said sealing edge on that side thereof remote from said first radially inner segment, both radially inner segments being uneven.

10. A sealing ring in combination according to claim 9, in which both of said radially inner segments are respectively provided with web-like elevations in the form of twist ribs of the running surface of said sealing lip.

11. A sealing ring in combination according to claim 10, in which said elevations of said radially inner segments extend in the axial direction.

* * * * *